US010487953B2

(12) United States Patent
Chen

(10) Patent No.: US 10,487,953 B2
(45) Date of Patent: Nov. 26, 2019

(54) VALVE CORE

(71) Applicant: KUCHING INTERNATIONAL LTD., Tanzih Township, Taichung County (TW)

(72) Inventor: Mei-Li Chen, Tanzih Township, Taichung County (TW)

(73) Assignee: KUCHING INTERNATIONAL LTD., Tanzih Township, Taichung County (TW)

( * ) Notice: Subject to any disclaimer, the term of this patent is extended or adjusted under 35 U.S.C. 154(b) by 58 days.

(21) Appl. No.: 15/959,737

(22) Filed: Apr. 23, 2018

(65) Prior Publication Data

US 2019/0323616 A1 Oct. 24, 2019

(51) Int. Cl.
*F16K 11/074* (2006.01)

(52) U.S. Cl.
CPC .................................. *F16K 11/074* (2013.01)

(58) Field of Classification Search
CPC ................................................ Y10T 137/9464
USPC ...................................... 251/155; 137/625.46
See application file for complete search history.

(56) References Cited

U.S. PATENT DOCUMENTS

| | | | | | |
|---|---|---|---|---|---|
| 4,077,545 | A * | 3/1978 | Karls | E03C 1/0411 137/339 |
| 5,020,569 | A * | 6/1991 | Agresta | E03B 7/074 137/544 |
| 6,394,127 | B1 * | 5/2002 | Creswell | B01D 35/04 137/544 |
| 8,613,293 | B2 * | 12/2013 | Bolgar | F16K 11/0743 137/597 |
| 8,695,635 | B1 * | 4/2014 | Wang | F16K 11/0787 137/597 |
| 2007/0045449 | A1 * | 3/2007 | Herring | B05B 1/3046 239/525 |
| 2016/0305101 | A1 * | 10/2016 | Liu | F16K 11/0787 |
| 2016/0341323 | A1 * | 11/2016 | Wu | C02F 1/42 |
| 2017/0089474 | A1 * | 3/2017 | Zhan | F16K 11/0743 |
| 2017/0363216 | A1 * | 12/2017 | Schmitt | E03C 1/04 |

* cited by examiner

*Primary Examiner* — John Fox
(74) *Attorney, Agent, or Firm* — Egbert, McDaniel & Swartz, PLLC

(57) ABSTRACT

A valve core has a housing which is a hollow cylindrical structure with both ends defined as an open end and a through end respectively; a base mounted on the housing to close the open end of the housing; a fixed valve plate mounted on the base in a liquid tight mode and unable to rotate relative to the base; a movable valve plate which is rotationally arranged on the fixed valve plate in a liquid tight mode; a manipulation assembly, one end of which is configured on the movable valve plate to manipulate the movable valve plate to rotate relative to the fixed valve plate, and the other end of which is extended to penetrate the through end of the housing.

7 Claims, 10 Drawing Sheets

VALVE CORE

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates generally to a valve core, and more particularly to an innovative structural type, in which water enters from the bottom and goes out from the side wall, and is used to connect to a water purification device.

2. Description of Related Art Including Information Disclosed Under 37 CFR 1.97 and 37 CFR 1.98

In the situation that a flow channel in a conventional valve core has not been redesigned to hastily install a water purification device at its front end, when the valve core closes its flow channel, the back pressure generated relative to the water purification device and the water pressure continuously acting on the water purification device by the raw water make the water purification device sustain double pressure for a long time to cause leakage. If the water purification device is installed under the sink, and when leakage is found, usually the situation has become quite serious. And if a leak detector is further installed, it will cause consumers unnecessary expenses.

BRIEF SUMMARY OF THE INVENTION

The technical features of the present invention to solve the problems are mainly that the valve core adopts novel flow channel design between the base, fixed valve plate, movable valve plate and the manipulation assembly to achieve practical progress and better industrial economy (utilization) benefits of applying to special style water output structure, prolonging the service life of water purification device, avoiding purified water blended with raw water, and multiple uses etc.

DETAILED DESCRIPTION OF THE INVENTION

Figure 1:
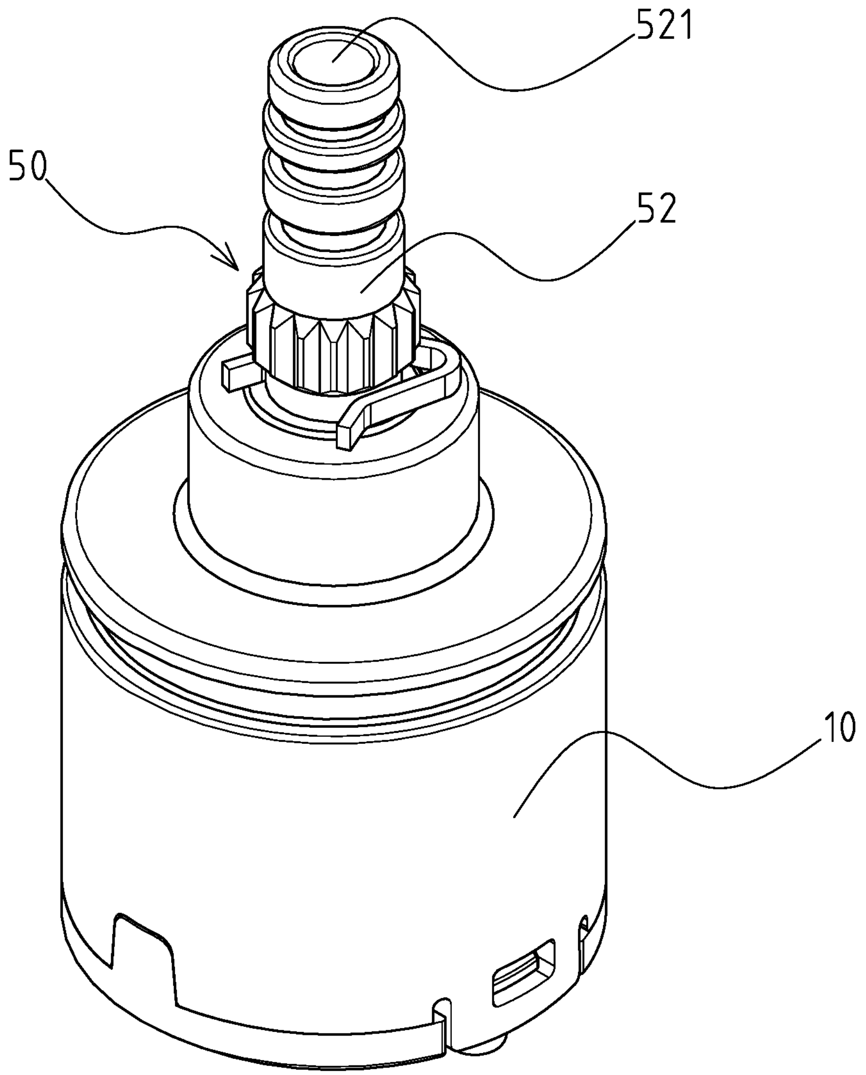
FIG. 1 is a perspective view of the present invention.
Figure 2:
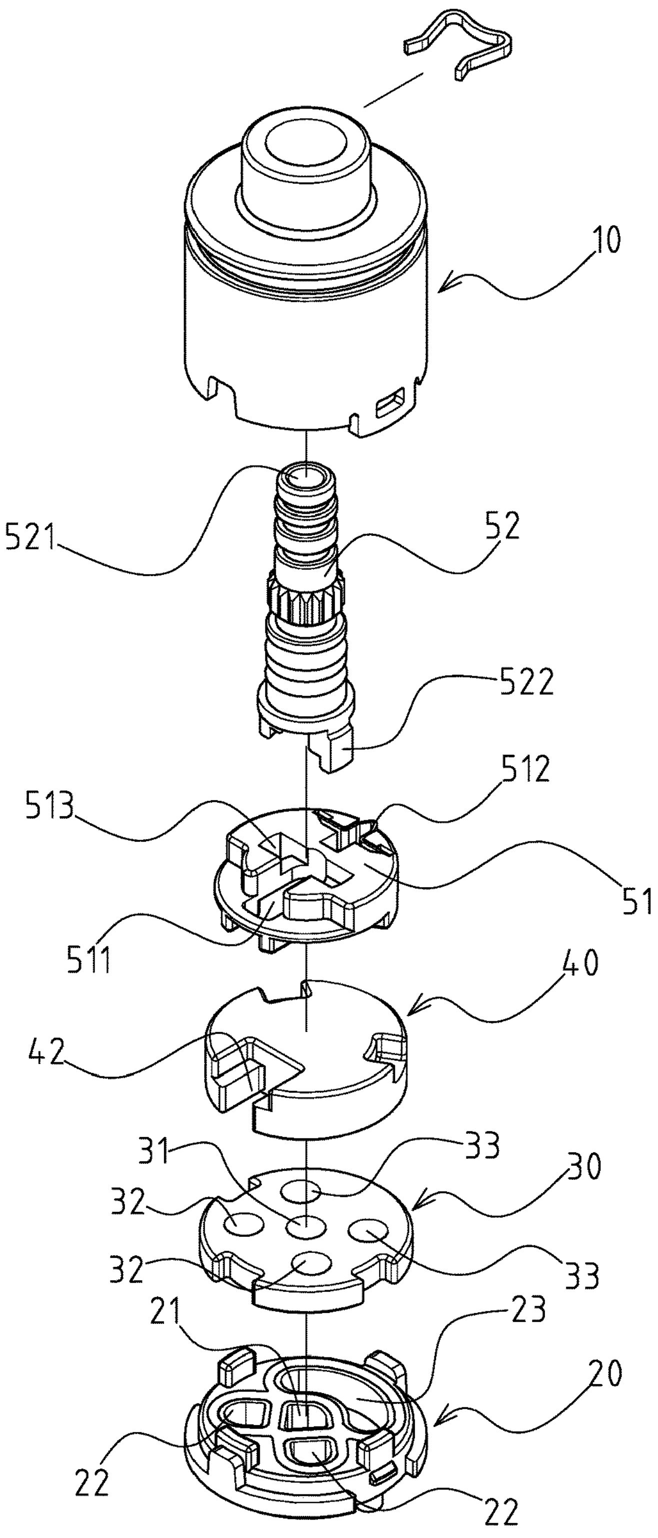
FIG. 2 is an exploded perspective view of the present invention.

Referring to FIGS. 1, 2, 5, and 6, which are preferred embodiments of the valve core of the present invention, these embodiments are for illustrative purposes only, and the patent application is not limited by this structure. The valve core comprises a housing 10 which is a hollow cylindrical structure with both ends defined as an open end and a through end respectively; a base 20 mounted on the housing 10 to close the open end of the housing 10; a fixed valve plate 30 mounted on the base 20 in a liquid tight mode and unable to rotate relative to the base 20; a movable valve plate 40 which is rotationally arranged on the fixed valve plate 30 in a liquid tight mode; a manipulation assembly 50, one end of which is configured on the movable valve plate 40 to manipulate the movable valve plate 40 to rotate relative to the fixed valve plate 30, and the other end of which is extended to penetrate the through end of the housing 10.

Figure 8:
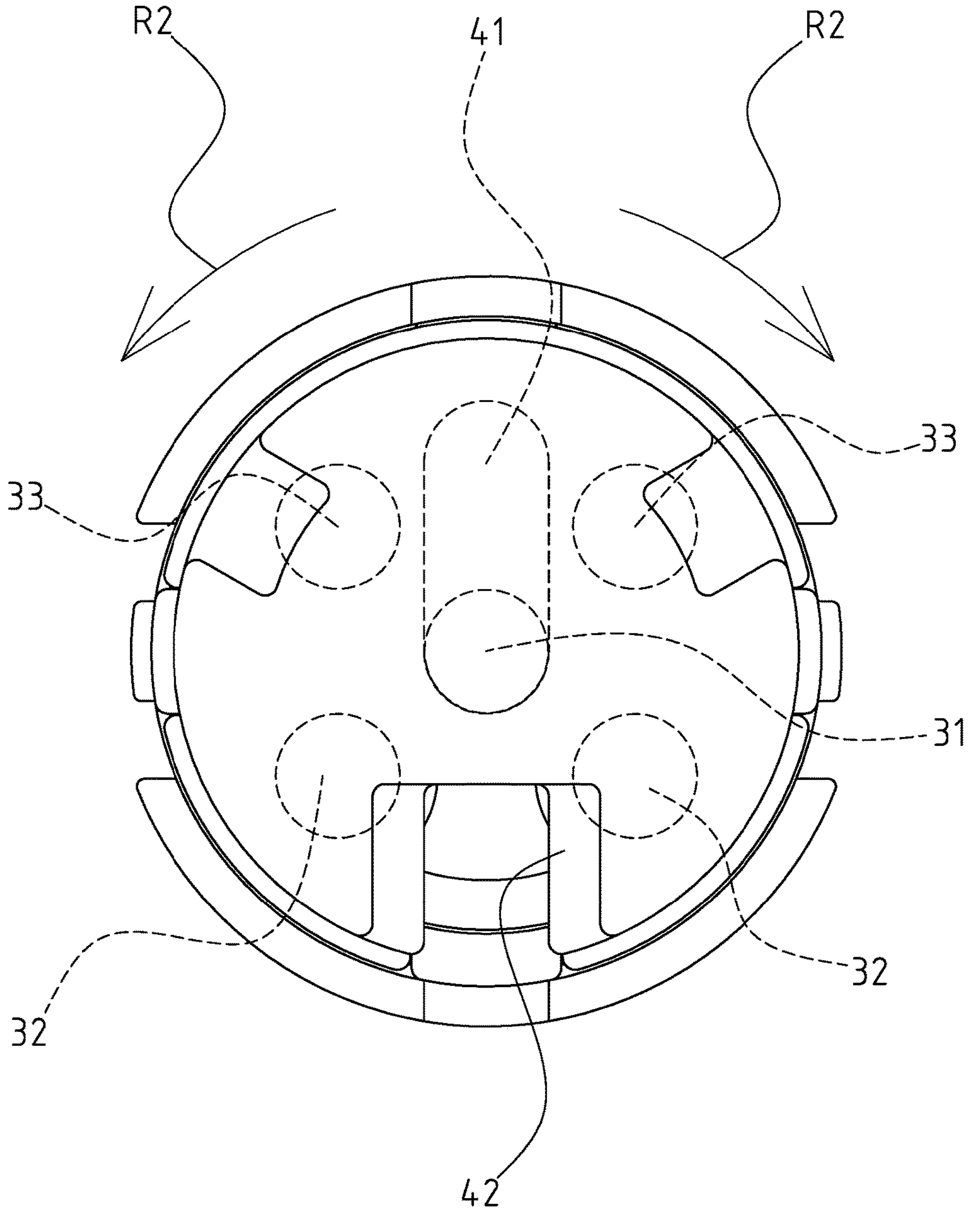
FIG. 8 is a top view of the present invention where the housing and the manipulation assembly are removed and the valve core is in a closed state.
Figure 9:
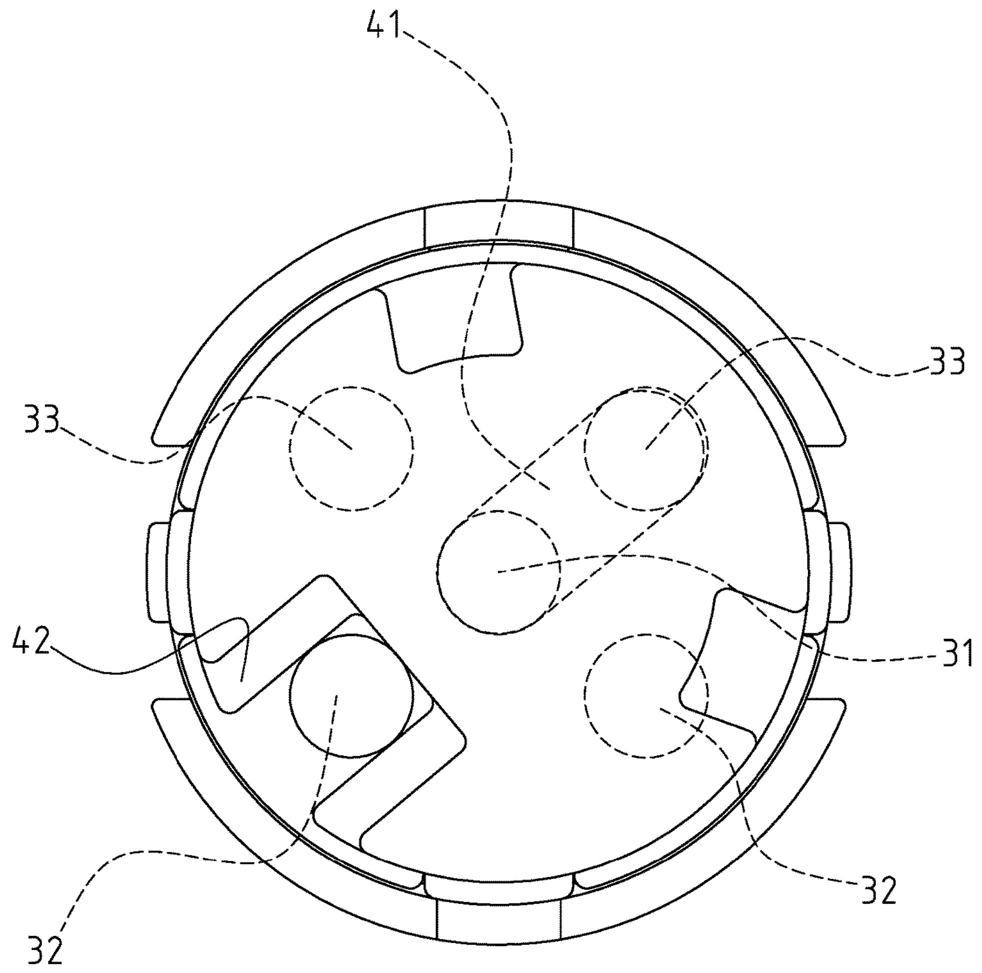
FIG. 9 is a schematic diagram showing the action of the present invention in a first water discharge state.
Figure 10:
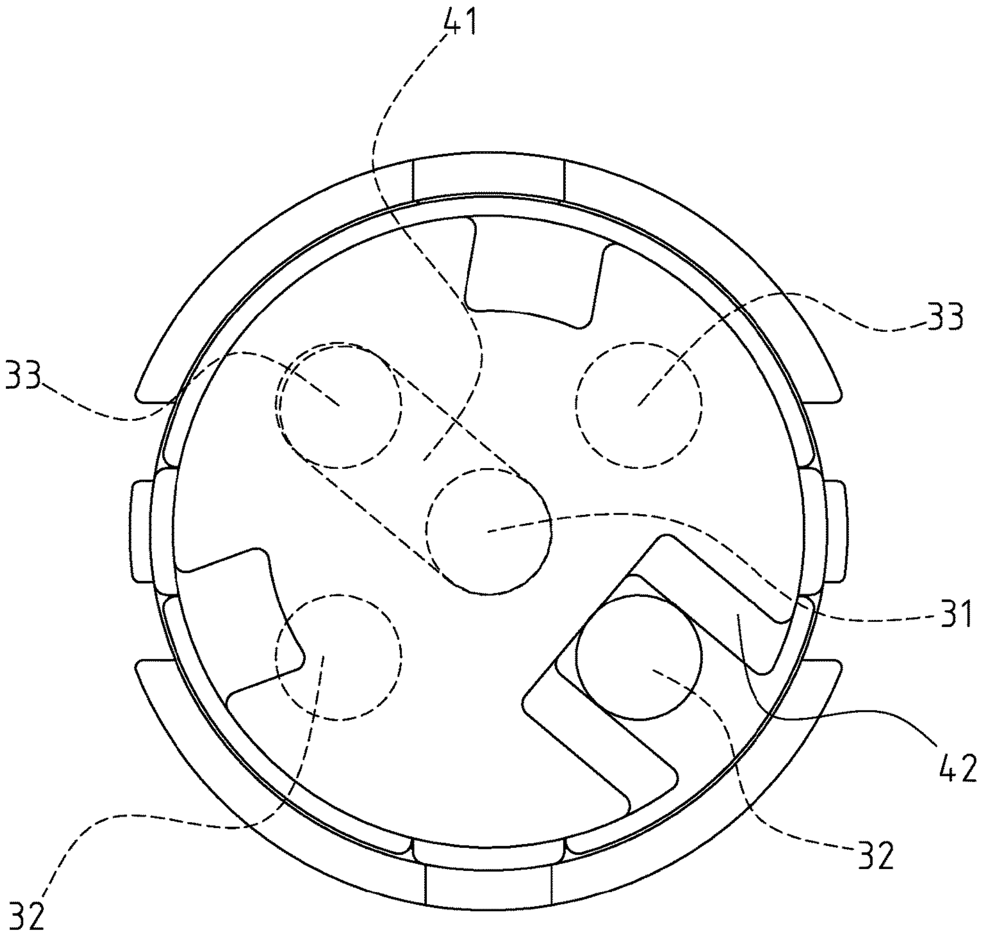
FIG. 10 is a schematic diagram showing the action of the present invention in a second water discharge state.
Figure 8A:
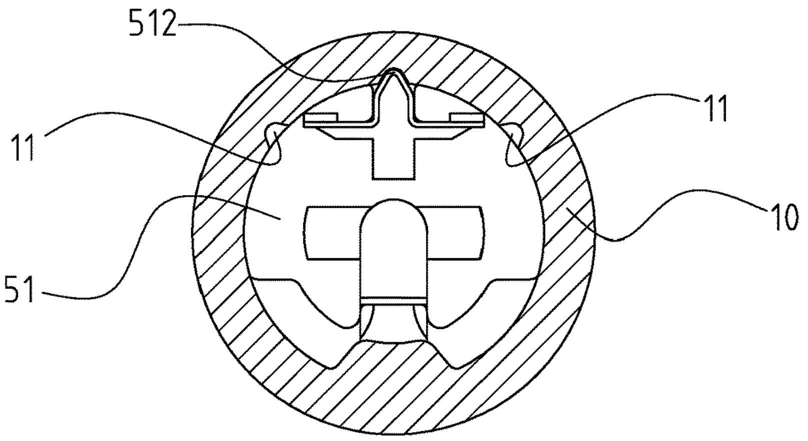
FIG. 8A is a schematic diagram of the manipulation assembly in clamping and positioning of the present invention in a closed state.
Figure 9A:
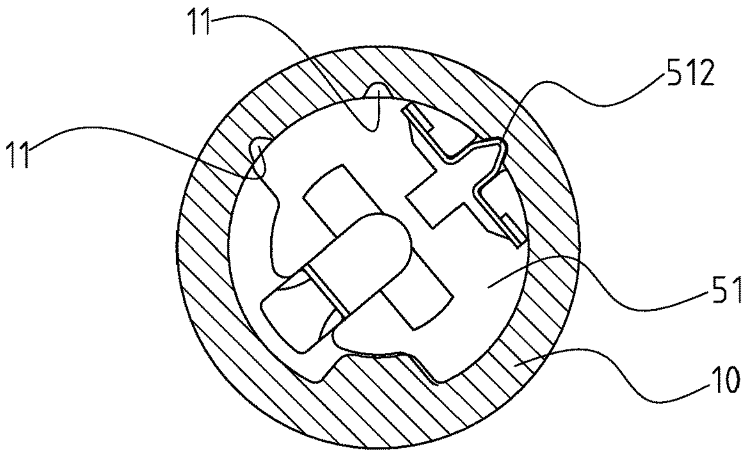
FIG. 9A is a schematic diagram of the manipulation assembly in clamping and positioning of the present invention in a first water discharge state.
Figure 10A:
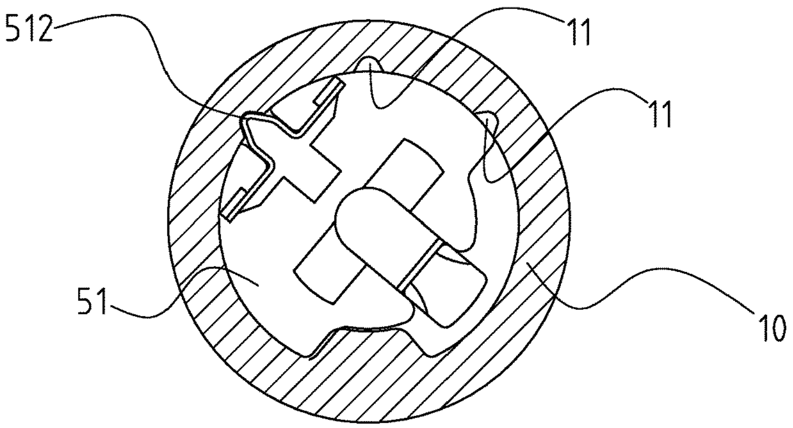
FIG. 10A is a schematic diagram of the manipulation assembly in clamping and positioning of the present invention in a second water discharge state.

Referring to FIG. 8A, at least two clamping grooves 11 are formed on the inner peripheral wall of the housing 10. In the preferred embodiment of the present invention, three equally spaced clamping grooves 11 are formed on the inner peripheral wall of the housing 10.

Figure 3:
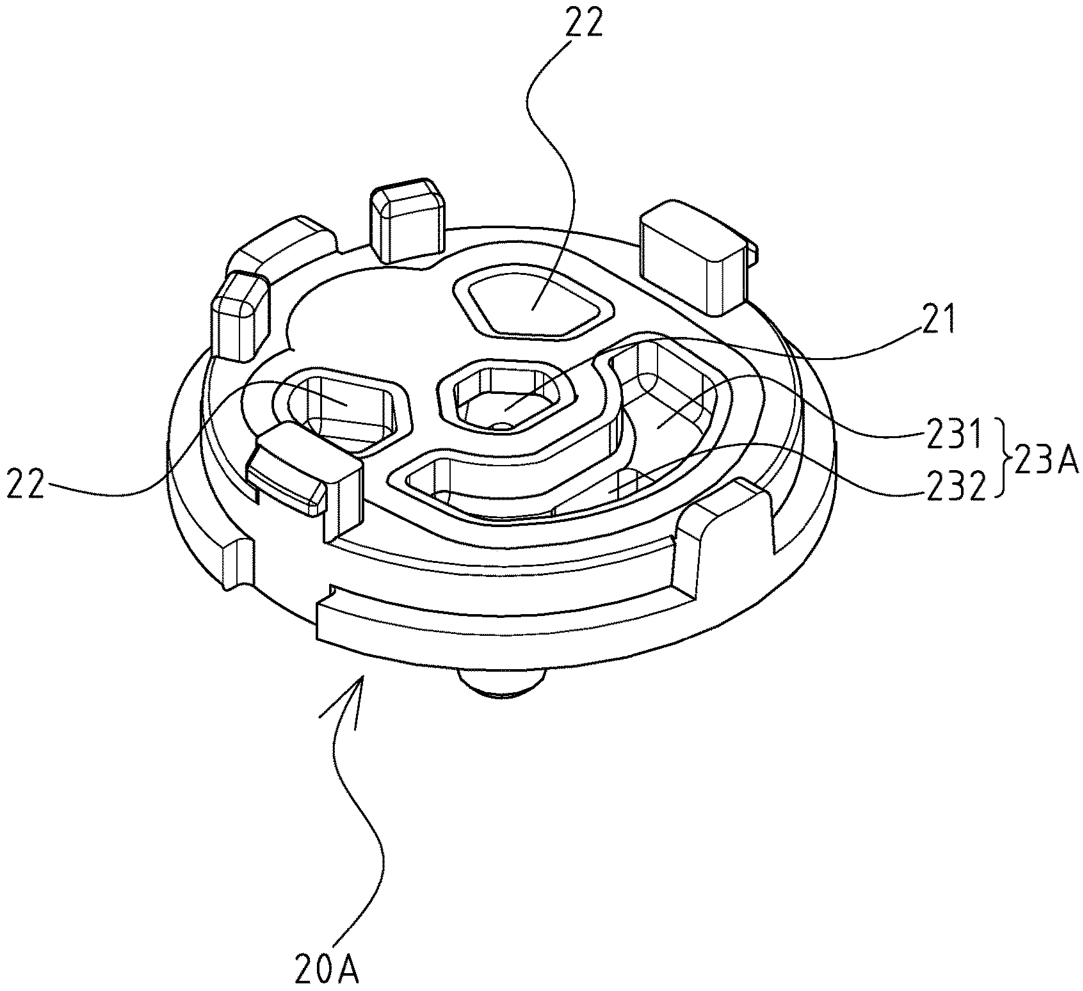
FIG. 3 is a perspective view of the second embodiment of the base of the present invention.
Figure 4:
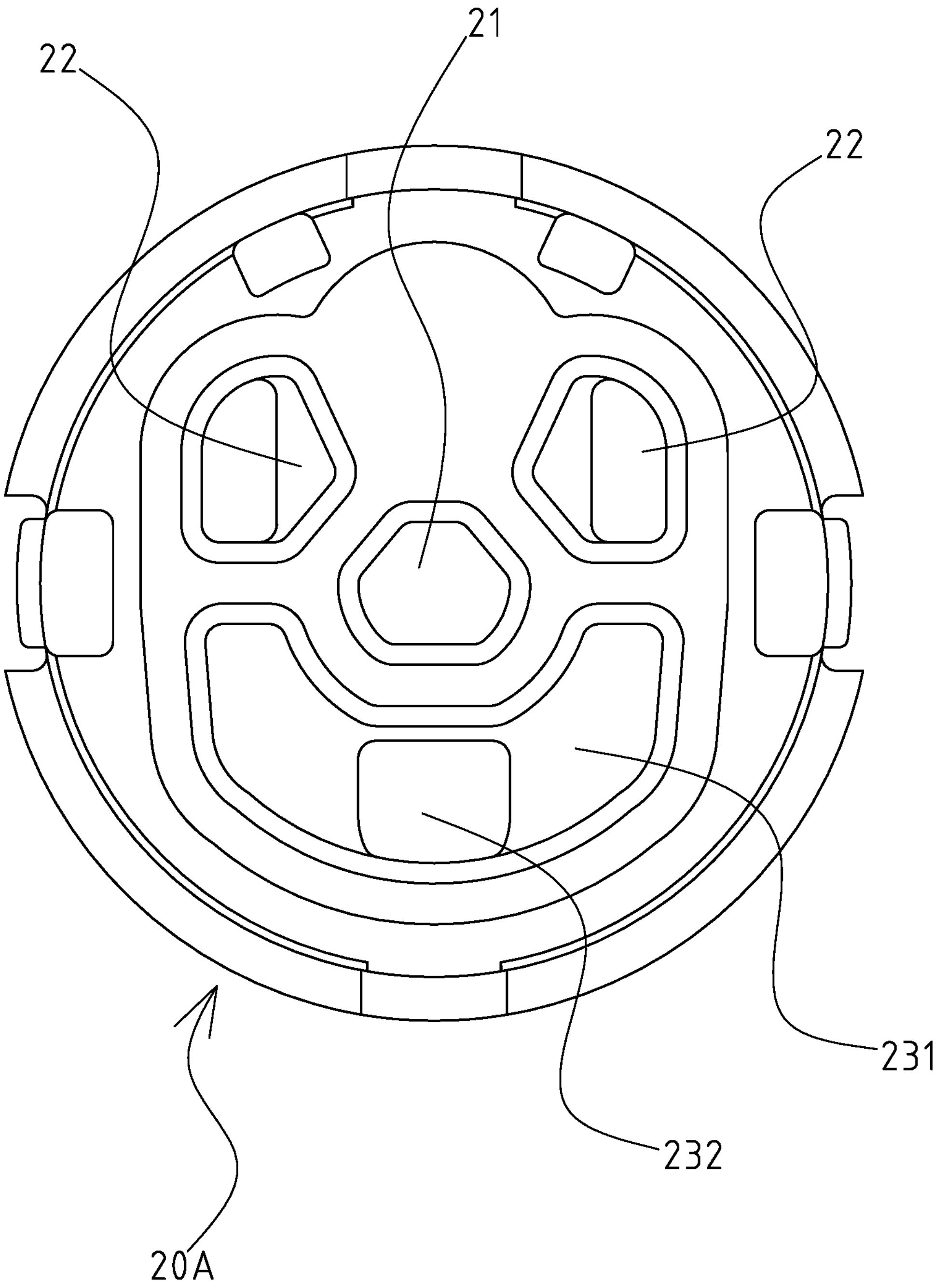
FIG. 4 is a top view of the second embodiment of the base of the present invention.
Figure 5:
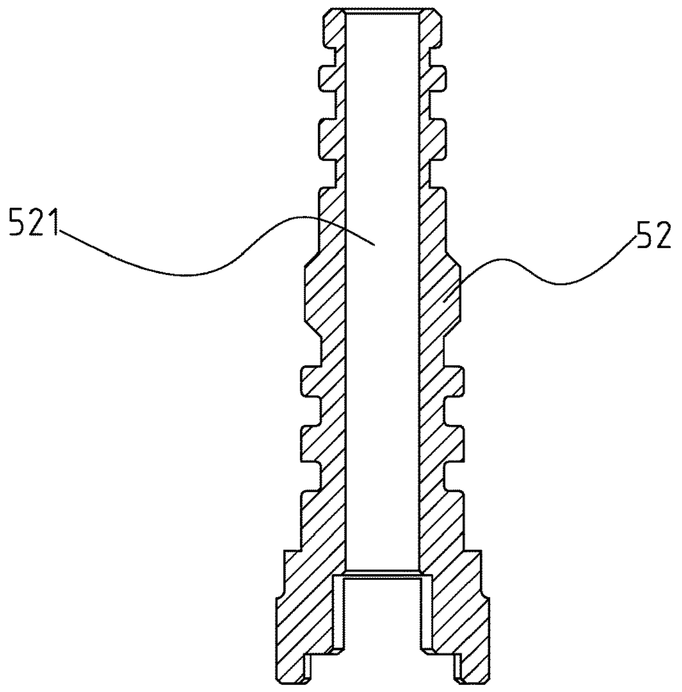
FIG. 5 is a top view of the control rod of the present invention.

The base 20 comprises a first water-inlet channel 21 axially formed at the central portion of the base; the first water-inlet channel 21 is used to connect to a source of raw water; at least one second water-inlet channel 22 axially formed on the base 20 and located at the outer edge of the first water-inlet channel 21; the at least one second water-inlet channel 22 is used to connect to a corresponding water outlet of the water purification device; a water outlet channel 23 axially formed on the base 20 and at the outer edge of the first water-inlet channel 21; the water-outlet channel 23 is used to connect to the water inlet of the water purification device. In a preferred embodiment of the present invention, two second water-inlet channels 22 are axially formed on the base 20; the water outlet channel 23 of the base 20 is disposed in an arc shape, and both ends of the water outlet channel are respectively extended toward the direction of a corresponding second water-inlet channel 22 on the base 20. Referring to FIGS. 3 and 4, which are the second preferred embodiments of the base 20 of the present invention, in the preferred embodiment, the water outlet channel 23A of the base 20A includes an arc-shaped groove 231, and the central bottom section of the arc-shaped groove 231 is formed with a water outlet 232. The water outlet 232 is used to connect to the water inlet of the water purification device.

The fixed valve plate 30 comprises a first water-inlet channel 31 axially formed at the central portion of the fixed valve plate; the first water-inlet channel 31 of the fixed valve plate 30 and the first water-inlet channel 21 of the base 20 communicate with each other; at least one second water-inlet channel 32 axially formed on the fixed valve plate 30; the at least one second water-inlet channel 32 of the fixed valve plate 30 and the at least one second water-inlet channel 22 of the base 20 communicate with each other; at least one water outlet channel 33 axially formed on the fixed valve plate 30; the water outlet channel 33 of the fixed valve plate 30 and the water outlet channel 23 of the base plate 20 communicate with each other. In the preferred embodiment of the present invention, the fixed valve plate 30 is axially formed with two second water-inlet channels 32. Each second water-inlet channel 32 on the fixed valve plate 30 communicates with a corresponding second water-inlet channel 22 on the base 20. The fixed valve plate 30 is axially formed with two water outlet channels 33. Each water outlet channel 33 of the fixed valve plate 30 communicates with the water outlet channel 23 on the base 20. Please refer to FIG. 7. The end face of the movable valve plate 40 attached to the fixed valve plate 30 is divided into four quadrants by the mutually orthogonal X-axis 70 and Y-axis 80. The two water outlet channels 33 of the fixed valve plate 30 are respectively located in the first quadrant and the second quadrant, and the two second water-inlet channels 32 of the fixed valve plate 30 are respectively located in the third quadrant and the fourth quadrant, wherein the water outlet channels 33 on the first quadrant corresponds to the second water-inlet channels 32 on the third quadrant in usage, and the water outlet channels 33 on the second quadrant corresponds to the second water-inlet channels 32 on the fourth quadrant in usage. For the fixed valve plate 30, the second water-inlet channels 32 on the third and fourth quadrants respectively communicate with the first water outlet and the second water outlet of the water purification device (not shown) through a corresponding second water-inlet channel 22 of the base 20.

Figure 6:
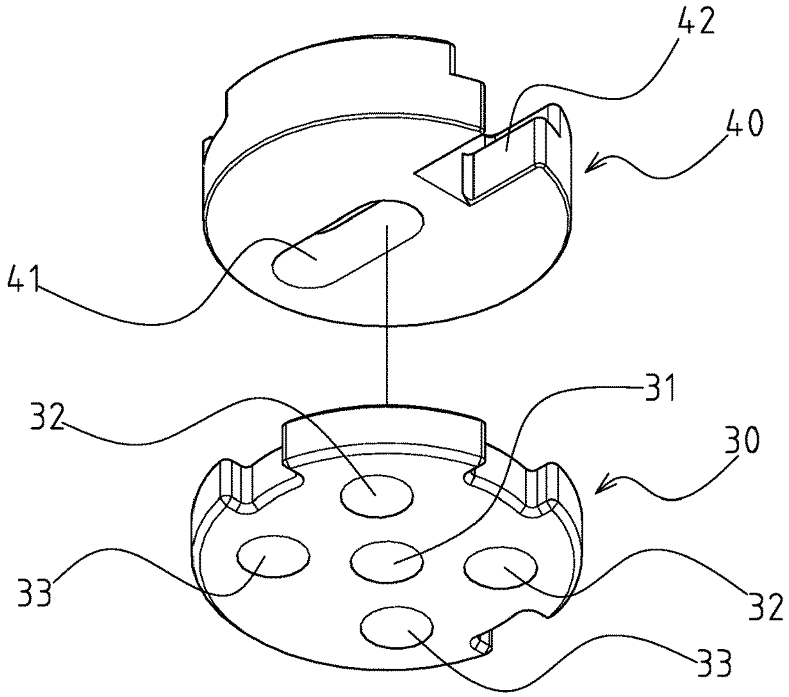
FIG. 6 is another perspective view of the fixed valve plate and the movable valve plate of the present invention.

Referring to FIG. 6, the movable valve plate 40 is formed with a communicating groove 41 and a groove 42. The communicating groove 41 is formed on a surface of the movable valve plate 40 that is attached to the fixed valve plate 30. The first end of the communicating groove 41 and the first water-inlet channel 31 of the fixed valve plate 30 communicate with each other, and the second end of the communicating groove 41 selectively communicates with at least one water outlet channel 33 on the fixed valve plate 30. The groove 42 is formed on the side edge of the movable valve plate 40 and selectively communicates with at least one second water-inlet channel 32 of the fixed valve plate 30. In a preferred embodiment of the present invention, the communicating groove 41 on the movable valve plate 40 is radially disposed. When the movable valve plate 40 reciprocally rotates relative to the fixed valve plate 30, the second end of the communicating groove 41 selectively communicates with a corresponding water outlet channel 33 on the fixed valve plate 30, and the groove 42 selectively communicates with a corresponding second water-inlet channel 32 on the fixed valve plate 30.

The manipulation assembly 50 comprises a disc body 51 and a control rod 52 concentrically mounted and clamped on the disc body 51 and synchronously rotating with the disc body 51 relative to the housing 10, wherein the control rod 52 is extended to penetrate the through end of the housing 10, and the disc body 51 is configured and clamped to the movable valve plate 40 opposite to the other surface of the fixed valve plate 30. A communicating groove 511 is formed on the disc body 51. The communicating groove 511 on the disc body 51 and the groove 42 of the movable valve plate 40 communicate with each other. The control rod 52 has an axially formed through hole 521, and the through hole 521 communicates with the communicating grooves 511 on the disc body 51. The disc body 51 is further equipped with a clamping member 512. The clamping member 512 is clamped in a corresponding clamping groove 11 on the inner peripheral wall of the housing 10, so as to temporarily position the manipulation assembly 50 relative to the housing 10. In a preferred embodiment of the present invention, In a preferred embodiment of the present invention, the disc body 51 is formed with a slot 513 on each of the two sides of the communicating slot 511 opposite to the other surface of the movable valve plate 40, and the control rod 52 is extended with two tenons 522 with respect to the end of the disc body 51. When the control rod 52 is concentrically mounted and clamped on the disk body 51, each tenon 522 is inserted into a corresponding slot 513.

Figure 7:
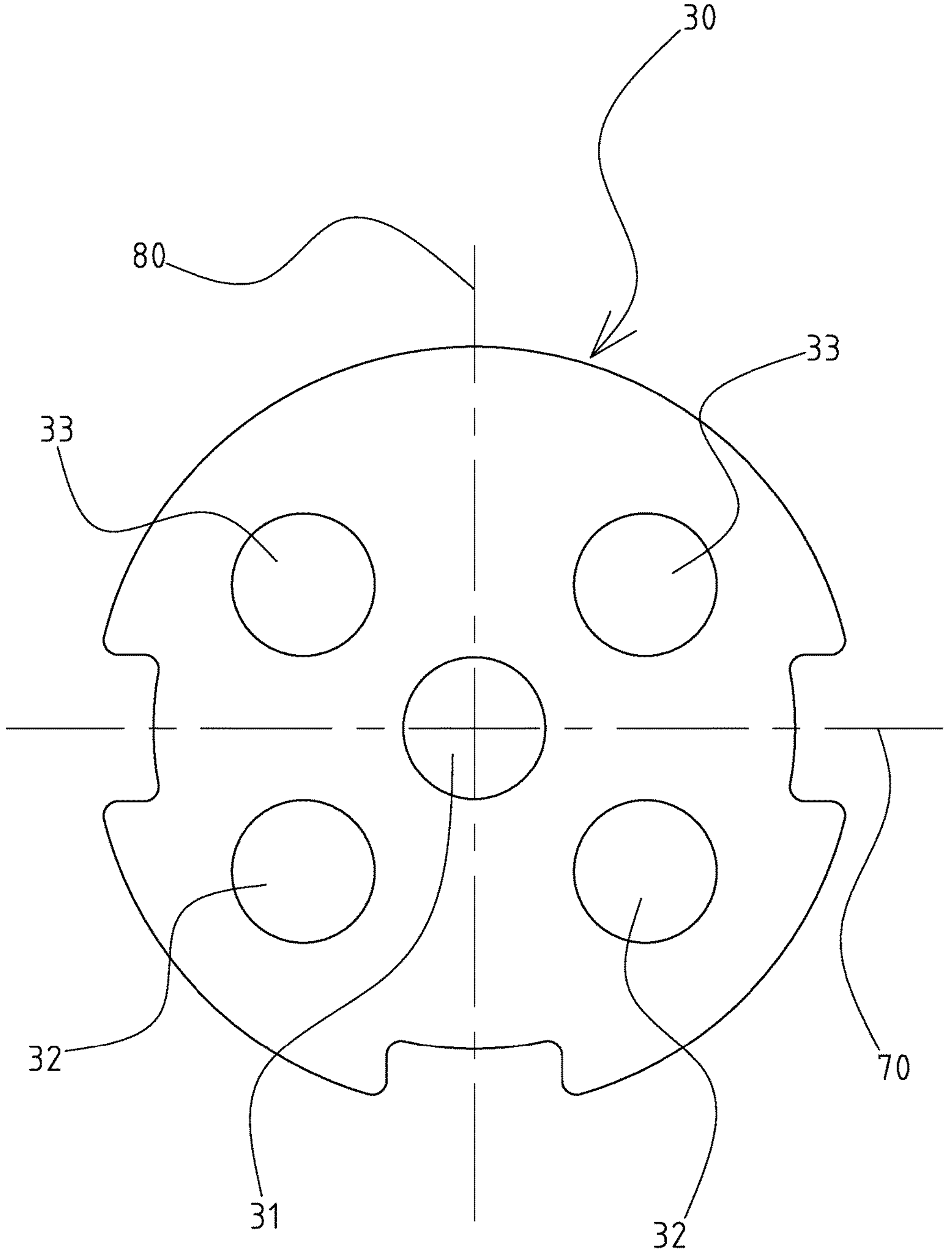
FIG. 7 is a top view of the fixed valve plate of the present invention.

With the above structural design, the operation of the present invention is described as follows: as shown in FIGS. 7, 8, and 8A, when the present invention is in the closed state, the end portion of clamping member 512 is clamped to the central clamping groove 11, and the second end of the communicating groove 41 of the movable valve plate 40 is closed by the fixed valve plate 30. Therefore, raw water can only enter the communicating groove 41 of the movable valve plate 40 through the first water-inlet channel 21 of the base 20 and the first water-inlet channel 31 of the fixed valve plate 30, and cannot flow out to enter the water purification device of the present invention. Surely, no purified water can be provided.

Referring to FIGS. 7, 8, 9, and 9A, when a user uses the manipulation assembly 50 to rotate the movable valve plate 40 relative to the fixed valve plate 30 in the direction of the arrow R1 in FIG. 8, the clamping member 512 is clamped in a clamping groove 11 on a corresponding side. The second end of the communication groove 41 communicates with the water outlet channel 33 of the fixed valve plate 30 in the first quadrant, and the groove 42 and the second water-inlet channel 32 of the fixed valve plate 30 in the third quadrant communicate with each other. On the fixed valve plate 30, the water outlet channel 33 located in the second quadrant and the second water-inlet channel 32 located in the fourth quadrant are closed by the movable valve plate 40. At this time, the raw water enters into the communicating groove 41 of the movable valve plate 40 through the first water-inlet channel 21 of the base 20 and the first water-inlet channel 31 of the fixed valve plate 30, and then enters the water purification device through the water outlet channel 33 of the fixed valve plate 30 in the first quadrant and the water outlet channel 23/23A of the base 20/20A. The filtered purified water, after flowing through the corresponding second water-inlet channel 22 on the base 20 and the second water-inlet channel 32 of the fixed valve plate 30 in the third quadrant through the first water outlet of the water purification device, is sent out of the valve core sequentially through the groove 42 of the movable valve plate 40 and the communicating groove 511 of the disc body 51 and finally through the through hole 521 of the control rod 52.

Referring to FIGS. 7, 8, 10, and 10A, when a user uses the manipulation assembly 50 to rotate the movable valve plate 40 relative to the fixed valve plate 30 in the direction of the arrow R2 in FIG. 8, the clamping member 512 is clamped in a clamping groove 11 on a corresponding side. The second end of the communication groove 41 of the movable valve plate 40 communicates with the water outlet channel 33 of the fixed valve plate 30 in the second quadrant, and the groove 42 and the second water-inlet channel 32 of the fixed valve plate 30 in the fourth quadrant communicate with each other. On the fixed valve plate 30, the water outlet channel 33 located in the first quadrant and the second water-inlet channel 32 located in the third quadrant are closed by the movable valve plate 40. At this time, the raw water enters into the communicating groove 41 of the movable valve plate 40 through the first water-inlet channel 21 of the base 20 and the first water-inlet channel 31 of the fixed valve plate 30, and then enters the water purification device through the water outlet channel 33 of the fixed valve plate 30 in the second quadrant and the water outlet channel 23/23A of the base 20/20A. The filtered purified water, after flowing through the corresponding second water-inlet channel 22 on the base 20 and the second water-inlet channel 32 of the fixed valve plate 30 in the fourth quadrant through the second water outlet of the water purification device, is sent out of the valve core sequentially through the groove 42 of the movable valve plate 40 and the communicating groove 511 of the disc body 51 and finally through the through hole 521 of the control rod 52.

The valve core described in this invention has the following advantages:

1. Application to special style water output structure: in this invention, the water inlet and outlet channels for the raw water and the water inlet channel for purified water are disposed on the base, and the outflowing of the purified water uses a through hole axially formed on the control rod, so the present invention is convenient to install in the gooseneck-shaped water output structure.

2. Prolonging the service life of the water purification device: the present invention is designed with an original flow channel, so, after the assembly is completed, the raw water delivery line is located at the front end of the water purification device, and, at the beginning of valve core design, static pressure test, liquid tightness test and water hammer test have been considered. Therefore, when the present invention is in the closed state, the water pressure in the pipeline can be blocked, the service life of the watertight component in the water purification device can be prolonged, and the maintenance frequency can be reduced.

3. Avoidance of purified water mixing with raw water: the present invention sets its closed tap position between its two water output tap positions. Therefore, when the two water output tap positions are exchanged, it is certain to return to the closed tap position, and the phenomenon of purified water mixed with raw water can be avoided.

4. Multiple uses: since the base of the present invention is provided with two (purified water) second water inlet channels, and the two second water inlet channels on the base are respectively connected to the two water outlets of the water purification device, the water purification device can be installed with two filter cores. For example, the purified water provided by the first water outlet passes through a single filter core, and the purified water provided by the second water outlet passes through two filter cores, so that different water output tap positions can be selected according to the actual needs of the user, which can prolong the service life of the filter core of the water purification device. In addition, the two filter cores can also be set as different water purification functions. Using independent flow channels to connect to the first water outlet and the second water outlet respectively can equally produce purified water of different purification levels by choosing different water output tap positions.

I claim:

1. A valve core comprises:

a housing which is a hollow cylindrical structure with both ends defined as an open end and a through end respectively;

a base which is mounted on the housing to close the open end of the housing and comprises:

a first water-inlet channel axially formed at the central portion of the base; the first water-inlet channel is used to connect to a source of raw water;

at least one second water-inlet channel axially formed on the base and located at the outer edge of the first water-inlet channel; the at least one second water-inlet channel is used to connect to a water outlet of the water purification device; and a water outlet channel axially formed on the base and at the outer edge of the first water-inlet channel; the water-outlet channel is used to connect to the water inlet of the water purification device;

a fixed valve plate mounted on the base in a liquid tight mode, which is unable to rotate relative to the base; the fixed valve plate comprises:

a first water-inlet channel axially formed at the central portion of the fixed valve plate; the first water-inlet channel of the fixed valve plate and the first water-inlet channel of the base communicate with each other;

at least one second water-inlet channel axially formed on the fixed valve plate; the at least one second water-inlet channel of the fixed valve plate and the at least one second water-inlet channel of the base communicate with each other; and at least one water outlet channel axially formed on the fixed valve plate; the water outlet channel of the fixed valve plate and the water outlet channel of the base plate communicate with each other; and a movable valve plate which is rotationally arranged on the fixed valve plate in a liquid tight mode; the movable valve plate comprises:

a communicating groove which is formed on a surface of the movable valve plate that is attached to the fixed valve plate; one end of the communicating groove and the first water-inlet channel of the fixed valve plate communicate with each other, and the second end of the communicating groove selectively communicates with the water outlet channel on the fixed valve plate; and a groove which is formed on the side edge of the movable valve plate and selectively corresponds to at least one second water-inlet channel of the fixed valve plate; and a manipulation assembly which is configured on the movable valve plate to manipulate the movable valve plate to rotate relative to the fixed valve plate; the manipulation assembly comprises:

a disc body which is configured and clamped to the movable valve plate opposite to the other surface of the fixed valve plate; the disc plate is formed with a communicating groove and the communicating groove of the disc plate and the groove of the movable valve plate communicate with each other; and a control rod which is concentrically mounted on the disc body and extended to penetrate the through end of the housing, and close the through end of the housing in a liquid tight mode; the control rod is axially formed with a through hole, and the through hole communicates with the communicating grooves of the disc body.

2. The valve core defined in claim 1, wherein two second water-inlet channels are axially formed on the base; the fixed valve plate is axially formed with two second water-inlet channels; each second water-inlet channel on the fixed valve plate communicates with a corresponding second water-inlet channel on the base; the water outlet channel of the base is disposed in an arc shape, and both ends of the water outlet channel are respectively extended toward the direction of a corresponding second water-inlet channel on the base; the fixed valve plate is formed with two water outlet channels; each water outlet channel of the fixed valve plate communicates with the water outlet channel on the base.

3. The valve core defined in claim 2, wherein the communicating groove on the movable valve plate is radially disposed; when the movable valve plate reciprocally rotates relative to the fixed valve plate, the second end of the communicating groove selectively communicates with a corresponding water outlet channel on the fixed valve plate, and the groove selectively communicates with a corresponding second water-inlet channel on the fixed valve plate.

4. The valve core defined in claim 3, wherein the end face of the movable valve plate attached to the fixed valve plate is divided into four quadrants by the mutually orthogonal X-axis and Y-axis; the two water outlet channels of the fixed valve plate are respectively located in the first quadrant and the second quadrant, and the two second water-inlet channels of the fixed valve plate are respectively located in the third quadrant and the fourth quadrant, wherein the water outlet channels on the first quadrant corresponds to the second water-inlet channels on the third quadrant in usage, and the water outlet channels on the second quadrant corresponds to the second water-inlet channels on the fourth quadrant in usage; for the fixed valve plate, the second water-inlet channels on the third and fourth quadrants respectively communicate with the first water outlet and the second water outlet of the water purification device through a corresponding second water-inlet channel of the base.

5. The valve core defined in claim 4, wherein the disc body is formed with a slot on each of the two sides of the communicating slot opposite to the other surface of the movable valve plate, and the control rod is extended with two tenons with respect to the end of the disc body; When the control rod is concentrically mounted and clamped on the disk body, each tenon is inserted into a corresponding slot.

6. The valve core defined in claim 2, wherein the end face of the movable valve plate attached to the fixed valve plate is divided into four quadrants by the mutually orthogonal X-axis and Y-axis; the two water outlet channels of the fixed valve plate are respectively located in the first quadrant and the second quadrant, and the two second water-inlet channels of the fixed valve plate are respectively located in the third quadrant and the fourth quadrant, wherein the water outlet channels on the first quadrant corresponds to the second water-inlet channels on the third quadrant in usage, and the water outlet channels on the second quadrant corresponds to the second water-inlet channels on the fourth quadrant in usage; for the fixed valve plate, the second water-inlet channels on the third and fourth quadrants respectively communicate with the first water outlet and the second water outlet of the water purification device through a corresponding second water-inlet channel of the base.

7. The valve core defined in claim 6, wherein the disc body is formed with a slot on each of the two sides of the communicating slot opposite to the other surface of the movable valve plate, and the control rod is extended with two tenons with respect to the end of the disc body; When the control rod is concentrically mounted and clamped on the disk body, each tenon is inserted into a corresponding slot.

* * * * *